(No Model.) 2 Sheets—Sheet 1.
A. D. AYRES.
ELECTRO MAGNETIC BRAKE.
No. 492,773. Patented Mar. 7, 1893.
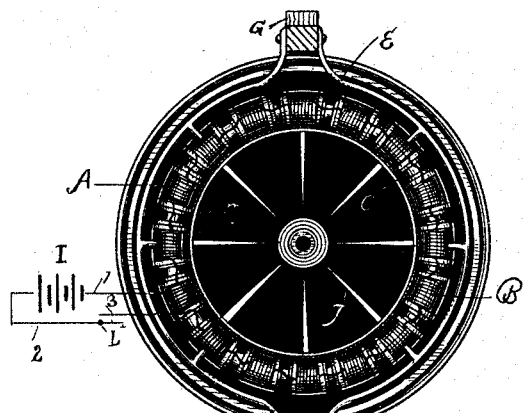
Fig. 2.
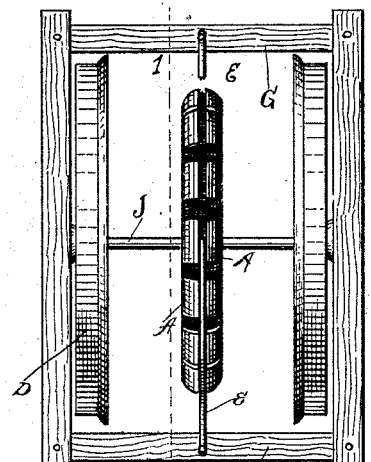
Fig. 1.
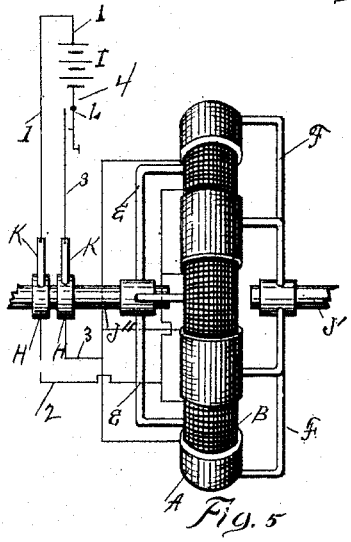
Fig. 5.
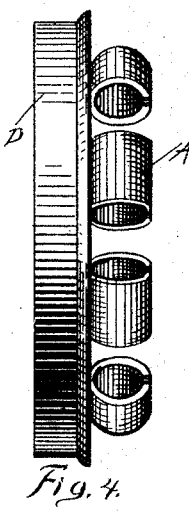
Fig. 4.
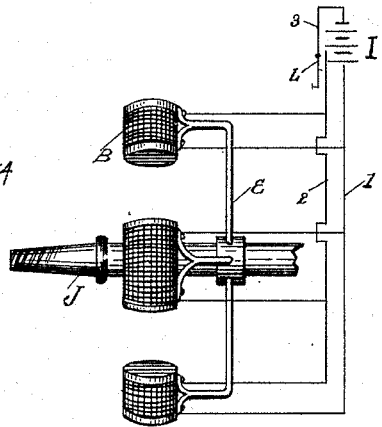
Fig. 3.
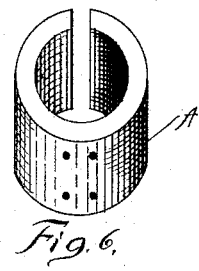
Fig. 6.
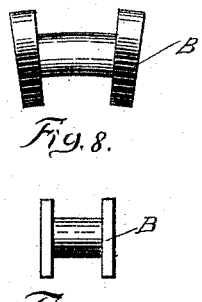
Fig. 8.
Fig. 7.
Fig. 9.
WITNESSES:
Lasalle J. Strait
Stewart L. Campbell
INVENTOR
Andrew D. Ayres
BY Hawes & Seely
ATTORNEY.

(No Model.) 2 Sheets—Sheet 2.
A. D. AYRES.
ELECTRO MAGNETIC BRAKE.
No. 492,773. Patented Mar. 7, 1893.
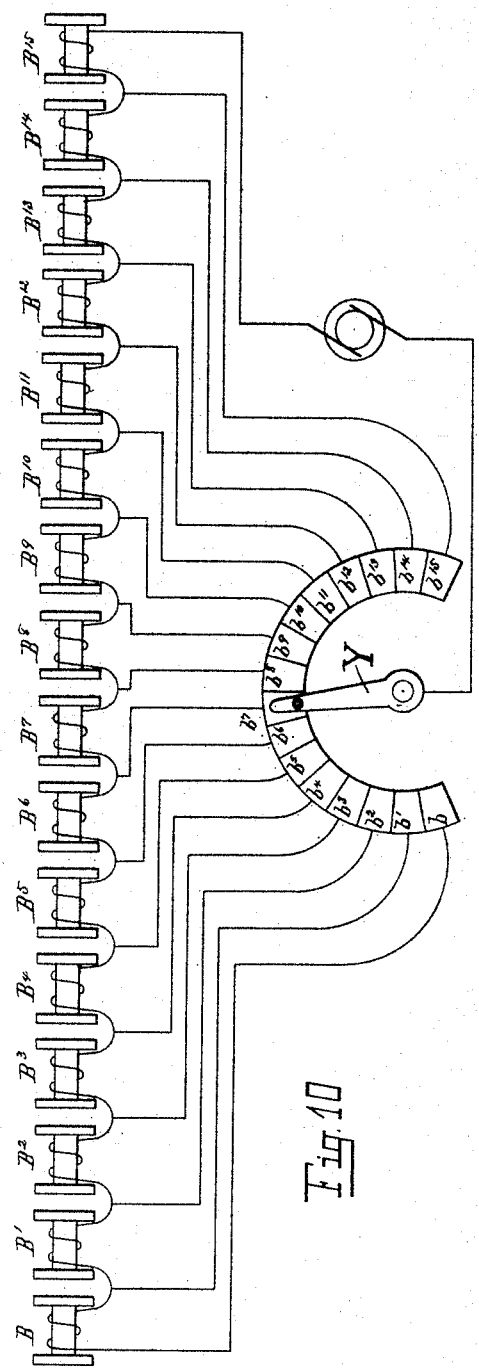
Fig. 10
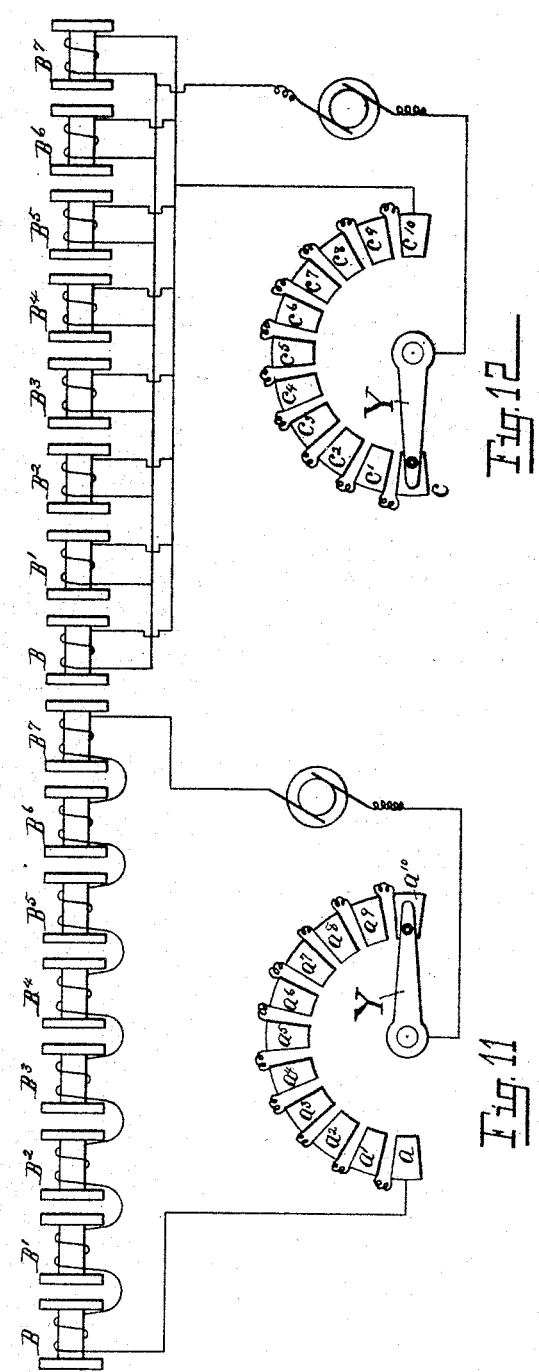
Fig. 12
Fig. 11
Witnesses:
Walter S. Wood
Lacelle J. Strait
Inventor.
Andrew D. Ayres
By Hawes & Luby
his Att'ys

UNITED STATES PATENT OFFICE.

ANDRUS D. AYRES, OF KALAMAZOO, MICHIGAN.

ELECTRO-MAGNETIC BRAKE.

SPECIFICATION forming part of Letters Patent No. 492,773, dated March 7, 1893.

Application filed December 21, 1891. Serial No. 415,749. (No model.)

*To all whom it may concern:*

Be it known that I, ANDRUS D. AYRES, a citizen of the United States of America, residing at the city of Kalamazoo, in the county of Kalamazoo and State of Michigan, have invented certain new and useful Improvements in Electro-Magnetic Brakes, of which the following is a specification.

The object of my invention is to produce a powerful and simplified electromagnetic brake. I attain this end by means of the mechanism and construction shown in the accompanying drawings which are made a part hereof, and in which like letters and figures refer to like parts throughout the several views.

My device is shown as applied to a vehicle truck or axle Figure 1, and to shafting Fig. 5.

Fig. 1. is a plan view of the brake, attached to the axle of a car truck, with one arm E broken away, to show the slot in the armatures through which the magnets are supported. Fig. 2. is an elevation or cross section taken through line 1, 1, of Fig. 1, and showing the armatures A in section and supported by the arms F from axle J, and the magnets B supported by the arms E to the truck beams G. Figs. 3 and 4, are modifications wherein, in Fig. 3 the magnets are shown as attached to the axle J, and—in Fig. 4—the shells attached to the wheel D. Fig. 5. is another modification wherein the brake is shown as attached to two shafts, the magnets to one, and the shells to the other, so as to operate like a friction brake or clutch. Fig. 6. is a perspective view of armature section A. Fig. 7. is a modified form of armature section A. Fig. 8. is a view of magnet spool B without the wire. Fig. 9. is a modified form of magnet spool B, to suit armature section shown in Fig. 7. Fig. 10 is a diagram of the circuits and devices employed whereby one, two or more magnets are energized at a time in order to produce a gradual increase in the power applied. This is accomplished as follows, referring to Fig. 10. Y is a switch which moves over the plates $b, b', b''$, &c. These plates are insulated from each other and connect respectively, directly, with the magnets B, B', B'', &c. When the switch Y is placed on $b^{15}$, a circuit is completed through $B^{15}$. When it is placed on $b^{14}$, it will complete a circuit through $B^{14}$ and $B^{15}$ and so on till the entire series of magnets are brought into action. Figs. 11 and 12 are diagrams of rheostats employed to increase the current by cutting out resistance. Fig. 11 shows the process when the magnets are in series and Fig. 12 when they are in parallel. In these figures $a, a', a''$, &c. and $c, c', c''$, &c. are plates connected with resistance coils and the resistances of these coils are cut out by the switch Y as it is moved from $a^{10}$ &c. and $c^{10}$ &c., the same as in an ordinary resistance box.

A, represents the armature sections. They are made of magnetic materials. B, the magnets. C, brass sections uniting the magnets. D, truck wheels. E, the arms supporting the magnets. F, the arms supporting the shells or armature sections. G, cross beams on the truck frame. H, two insulated metal rings on the shaft or axle, on which the brushes K rub, to transmit the current to the moving magnets B.

I, is the source of electricity.

J, is the axle. J' and J'' two shafts. K, circuit springs or brushes.

L, is a key or circuit closer.

1, 2, and 3, are circuit wires.

M, is the bed to which the shells A are firmly attached.

When it is desired to produce an arrangement to energize one two or more magnets, which will give a corresponding pull on the armature sections, it can be done by bringing the wires to a switch so that traction can be produced gradually up to the limit of all the magnets; or when one series is moving they can be brought in unison gradually with a properly constructed rheostat, so as to switch out resistance and thereby gradually increase the current, producing the gradual starting effect of a friction clutch, and in case of a truck with the wheels loose on the axles one or both sides can be allowed to move independently of the axles for a short time, to prevent skidding on curves &c. It will also be seen that the device is capable of many modifications,—not shown,—without departing from the invention.

The construction of the device is as follows: The spools B, and the incasing armatures A, are arranged so as to be in a circular form; so that the one can rotate within the other when in working condition. The spools are wound with wire, making the electromagnets; and are firmly united to the truck G, by means of the spokes, or arms E. The shells are firmly united to the bed M, which in turn is rigidly fixed to the axle or shaft J, by means of the spokes or arms F; The shells are so placed that the slot in them will allow them to pass the arms that support the magnets; and also furnish a place to bring out the wires.

The device when properly constructed and put in place operates as follows: See Figs. 1 and 2 on closing the key L, the current from the battery I, will follow wire No. 1, around each of the magnets, and back by wires 3 and 2 to the battery I. The magnets thus energized will inductively affect the armature sections which partially surround them and will tend to hold them fast, tearing the "lines of force" asunder on one after the other until the motion is stopped—if the current be sufficient—when they will be held fast unless the circuit is broken. It will be seen that as a shell comes over a magnet, the north pole in the magnet will induce a south pole in the shell and the south pole in the magnet induce a corresponding north pole in the shell, and will hold fast until broken asunder by a superior force, when the shells will turn until they are inductively affected by another magnet, when the same operation will be repeated, and so on until the motion ceases.

Figs. 3 and 4 show a modification in which the shells A are securely fastened to the wheel D, which—when in place—is free to rotate on the shaft or axle J. The magnets B, are supported from the axle, or shaft J, by the arms E, which pass through the slots in the shells and allow the shells to rotate over the magnets. Now should it be desired to stop the rotation of the wheel, the key L is closed and the circuit starting from battery I will follow wire No. 1, divide and flow around the magnets—which are connected in parallel—and back by wires 2 and 3 to the battery I. This will energize the magnets producing the result heretofore described.

Fig. 5, is another modification in which the shells A are held in a circle by the arms F from the shafting J' and compelled to rotate with it. The magnets B are supported by the arms E from the shafting J'', and compelled to rotate with it; and free to move inside the shells. Now should it be desired to make the two shafts rotate together—or in unison—the key L is depressed and the current as before starting from the battery I, will follow wire No. 1, through spring K ring H (which is insulated from the shaft) thence by wire No. 2, dividing between the magnets—which are connected in multiple—as shown; around these magnets and return by wire No. 3, ring H spring K key L wire No. 4, to the battery I. This will energize the magnets and inductively affect the shells, producing the same magnetic result as heretofore described. The only difference between this and the last modification being that the shells are attached to a shaft instead of to a wheel.

It will be seen that by the use of insulated rings H, and brushes K,—in the well known manner—on the axle in Fig. 3, the axle can be constructed to rotate,—as well as the wheels—and both brought in unison when desired: and by combining this with the arrangement shown in Figs. 1 and 2, it will be made so as to act both as a brake and clutch.

The word interrupted as hereinafter employed in the claim is used as comprehending in its meaning the definition of retarded and stopped in accordance with the functions of device shown and described. On the application of an electric current, the revolving element may be retarded and "hindered from proceeding," or it may be "stopped," according to the power applied.

Having thus described my invention, what I claim as new, and wish to secure by Letters Patent, is—

In an electric brake, in combination with a revolving element, a series of electromagnets and a series of incasing armatures, one of said series being firmly fixed to the revolving element, and the other series to an independent support, with means of energizing the series of magnets, whereby on the application of the current the revolving element is interrupted.

ANDRUS D. AYRES.

Witnesses:
LACELLE J. STRAIT,
STEWART L. CAMPBELL.